(12) United States Patent
Baker (10) Patent No.: US 11,311,362 B2
(45) Date of Patent: Apr. 26, 2022

(54) DENTAL DEVICE

(71) Applicant: Gary Baker, Surrey (CA)

(72) Inventor: Gary Baker, Surrey (CA)

( * ) Notice: Subject to any disclaimer, the term of this patent is extended or adjusted under 35 U.S.C. 154(b) by 154 days.

(21) Appl. No.: 16/658,561

(22) Filed: Oct. 21, 2019

(65) Prior Publication Data

US 2020/0155284 A1 May 21, 2020

Related U.S. Application Data

(60) Provisional application No. 62/768,528, filed on Nov. 16, 2018.

(51) Int. Cl.
*A61C 17/10* (2006.01)
*A61C 17/06* (2006.01)
*A61C 17/08* (2006.01)

(52) U.S. Cl.
CPC .............. *A61C 17/10* (2019.05); *A61C 17/08* (2019.05); *A61C 17/092* (2019.05)

(58) Field of Classification Search
CPC ........ A61C 17/10; A61C 17/092; A61C 17/08
USPC .......................................................... 433/93
See application file for complete search history.

(56) References Cited

U.S. PATENT DOCUMENTS

| | | | | |
|---|---|---|---|---|
| 1,742,080 A | * | 12/1929 | Jones | A61C 19/001 433/136 |
| 1,976,045 A | * | 10/1934 | Sorenson | A61C 19/00 33/513 |
| 2,315,660 A | * | 4/1943 | Sahr | A61C 9/0006 433/44 |
| 2,550,869 A | * | 5/1951 | Salisbury | A61B 17/6433 433/44 |
| 2,587,008 A | * | 2/1952 | Stadelmann | A61C 17/08 433/94 |
| 2,625,739 A | * | 1/1953 | Garmers | A61C 5/90 433/138 |
| 2,644,234 A | * | 7/1953 | Scott | A61C 19/001 433/136 |
| 2,830,371 A | * | 4/1958 | Dahl | A61B 13/00 433/93 |
| 2,832,137 A | * | 4/1958 | Moore | A61C 19/045 433/73 |
| 2,844,873 A | * | 7/1958 | Bober | A61C 17/08 433/136 |
| 3,091,859 A | * | 6/1963 | Baughan | A61C 17/08 433/96 |
| 3,101,543 A | * | 8/1963 | Baughan | A61C 17/08 433/94 |

(Continued)

*Primary Examiner* — Matthew M Nelson (57) ABSTRACT

A dental device to be placed in the oral cavity between the lower teeth and the tongue for use as a combined saliva/fluids ejector and tongue deflector/retractor in dental treatments, comprising: a substantially flat head portion with hollow tubing on a portion of its periphery, and suction holes (preferably oval-shaped and protected from soft tissue entrapment by raised ribs) and in communication with the hollow tubing; a body portion provided with a bore and a ratchet mechanism, the bore in communication at its upper end with the hollow tubing and at its lower end with a suction system; and an arm having a collar adapted to adjustably engage with and disengage from the teeth of the ratchet mechanism. The cross sections of the collar and ratchet mechanism portion of the body are essentially square in shape.

6 Claims, 5 Drawing Sheets

(56) References Cited

U.S. PATENT DOCUMENTS

| | | | | |
|---|---|---|---|---|
| 3,631,598 | A * | 1/1972 | Lussier | A61C 17/08 433/31 |
| 3,787,978 | A * | 1/1974 | Rogers | A61C 17/08 433/94 |
| 3,802,081 | A * | 4/1974 | Rogers | A61C 17/08 433/93 |
| 3,885,312 | A * | 5/1975 | Nordin | A61C 17/08 433/96 |
| 4,017,975 | A * | 4/1977 | Johnson | A61C 17/08 433/91 |
| 4,053,984 | A * | 10/1977 | Moss | A61C 17/10 433/140 |
| 4,259,067 | A * | 3/1981 | Nelson | A61C 17/08 433/93 |
| 4,325,695 | A * | 4/1982 | Sundelin | A61C 17/08 433/91 |
| 4,906,188 | A * | 3/1990 | Moseley | A61C 17/08 433/93 |
| 5,071,347 | A * | 12/1991 | McGuire | A61C 17/08 433/91 |
| 5,203,699 | A * | 4/1993 | McGuire | A61C 19/001 433/91 |
| 5,762,496 | A * | 6/1998 | Albertsson | A61C 17/08 433/93 |
| 5,803,731 | A * | 9/1998 | Nordstrom | A61C 17/08 433/96 |
| 5,890,899 | A * | 4/1999 | Sclafani | A61C 17/08 433/140 |
| 6,168,601 | B1 * | 1/2001 | Martini | A61B 17/025 433/140 |
| 2003/0124484 | A1 * | 7/2003 | Reiz | A61C 17/08 604/35 |
| 2011/0311942 | A1 * | 12/2011 | Black | A61C 17/08 433/93 |
| 2015/0359493 | A1 * | 12/2015 | Grant | A61B 6/04 378/20 |
| 2016/0135921 | A1 * | 5/2016 | Gordon | A61B 13/00 433/140 |
| 2018/0289869 | A1 * | 10/2018 | Fulton, III | A61M 1/84 |

* cited by examiner

FIG. 7 ized. The slot designed saliva/fluid removal is # DENTAL DEVICE

CROSS REFERENCE TO RELATED APPLICATIONS

This patent application claims priority from, and incorporates by reference, the entire disclosure of U.S. Provisional Patent Application No. 62/768,528, filed Nov. 16, 2018.

FIELD OF THE INVENTION

The present invention relates to the field of intraoral dental devices. More particularly, the present invention relates to the field of tongue deflectors/retractors and saliva/fluid ejectors for use in dental treatments and procedures.

BACKGROUND OF THE INVENTION

Different types of saliva/fluid ejectors and tongue retractors/deflectors for use during dental treatments are known. The present invention is discussed and illustrated in the context of saliva/fluid ejectors and tongue retractors/deflectors, combined in a single device, for use during dental treatments and procedures in the lower jaw (herein referred to as dental treatments). These devices typically involve a tongue shield, tubing with suction hole openings and are connected to dental suction system equipment. During dental treatments, these devices serve to shield and protect the work area in the lower jaw from encroachment and obstruction by the patient's tongue and to simultaneously removed excess fluids (saliva, blood, water, etc.) from the patient's oral cavity. Such issues are readily apparent to dental practitioners, and solutions to address such issues have been sought for as long as dentists and their personnel have been practising dentistry.

U.S. Pat. No. 4,017,975 discloses a combination saliva/fluids ejector and tongue retractor device formed with a flattened head/paddle enclosing internal suction passageways. Fluid suction apertures are provided around the top and bottom of the head. The head of the ejector is made of two mating plates that are snapped together around the end of a saliva ejector. The head, placed in the lower jaw, acts both as a guard to keep the tongue away from the lower teeth and to suction fluids from the oral cavity. A chin holder, having an integral side opening, is attached onto the saliva ejector to stabilize the device within the mouth during usage. This device has a number of shortcomings. The head needs to be assembled around the saliva ejector prior to its use. Conventional saliva ejector tubing is of limited strength and subject to deformation, which would adversely affect the stability and effectiveness of the appliance. The suction apertures, especially the lower ones where fluids are most likely to collect, are not protected against soft tissue entrapment, potentially compromising the suctioning function of the device. Further, the chin anchoring holder, attached to the round saliva ejector, is subject to rotational displacement leading to further instability of the device.

German Patent No. DE 10 2016 120 215 discloses a combination saliva/fluids ejector and tongue retractor device with a flattened head and suction tubing, integral to the head. The tubing extends into the body of the appliance and is connected at its lower end to the dental suction equipment. It exhibits a single slot for saliva/fluids removal and, on the undersurface of the tubing, two notches to choose from to engage the lower front teeth. In use, the appliance is placed onto the lower front teeth and between the lower side teeth and the tongue. This device also has a number of shortcomings. As illustrated, the head portion does not extend upwards enough to be even with or ideally slightly above the occlusal surfaces of the lower teeth and therefore is not large enough to retract and restrain a significant percentage of curious tongues. The slot designed saliva/fluid removal is unprotected and therefore subject to soft tissue entrapment blocking its suctioning ability. The two slots on the undersurface to the tubing, designed to engage the lower front teeth, are unnecessary and prevent the device from finding its own comfortable position within the patient's mouth. Additionally, there is no chin anchoring mechanism to prevent the device from lifting out of the mouth during use. Finally, designed and sized to attach to a "high-speed" suction line, the device is unnecessarily bulky, awkward and potentially uncomfortable.

SUMMARY OF THE INVENTION

Disclosed herein is a dental device for use in the lower jaw during dental treatments as a combination tongue deflector/retractor and saliva/fluids ejector. The dental device is adapted to attach to conventional saliva ejector tubing and dental suction equipment.

In accordance with an aspect of the present invention, disclosed herein is a dental device combining the functions of saliva/fluids removal and tongue retraction, when placed during dental treatment in the patient's oral cavity between the patient's tongue and lower teeth. The dental device comprises: (i) a head/paddle portion (referred herein as the head portion) which is substantially flat and has a periphery, and which comprises a hollow canal or tubing (referred to herein as a hollow tubing") extending around a portion of the periphery and one or more suction holes which are disposed near to the periphery and in communication with the hollow tubing; (ii) a body/shaft portion (referred to herein as the body portion) provided with a bore, the bore in communication at its upper end with the hollow tubing, and in communication at its lower end with a dental suction system or vacuum line (referred to herein as the dental suction system), and wherein the body portion is provided with a ratchet mechanism; and (iii) an arm/handle (referred to herein as the arm), having a collar adapted to adjustably engage with the ratchet mechanism.

When the dental device is in operation, the head portion is inserted into one side of the patient's mouth between the lower teeth and the tongue and presents a large surface which acts as a barrier to the tongue, retracting it away from the teeth (i.e. the dentist's work area). Once securely in place, the device is attached to the dental suction system and also functions to remove excess fluids (saliva, blood, water, etc.) from the patient's mouth.

The dental device is provided with an adjustable arm, which when in use is configured to abut the underside of the patient's chin, thereby securing the dental device in place during dental treatments. In one embodiment, the arm comprises an elongate first arm extension, a central collar, and an elongate second arm extension. The first arm extension is attached to the collar on the inward-facing (i.e. patient facing) side of the collar, and the second arm extension is attached to the collar on the opposite, outward-facing side of the collar. The body of the dental device is provided with a ratchet mechanism, located on an external surface of the body. The ratchet mechanism is adapted to allow the arm and the body of the dental device to releasably and adjustably engage with each other. In one embodiment, the ratchet mechanism is located on the external surface of the body which is on the inward-facing (i.e. patient-facing) side. In one embodiment, the collar of the arm is adapted to fit around the body and the ratchet mechanism. When engaged with the ratchet mechanism, the collar locks the arm, and therefore the whole device, in place during usage. The arm may be adjusted to the desired position along the ratchet mechanism to fit differently sized patients. In one embodiment, when the collar is disengaged from the ratchet mechanism, the arm is free to slide down the body, allowing the entire dental device to be readily removed from the patient's mouth.

In one aspect of the present invention, the ratchet mechanism comprises a plurality of teeth or barbs adapted to engage with and disengage from the collar of the arm. In this aspect, the teeth are adapted such that when downward pressure from the chin is applied to the first arm extension, the collar engages the teeth to anchor and secure the arm in place. On the other hand, when the downward pressure is applied to the second arm extension, the collar disengages away from the teeth—allowing the arm to slide down and off the body of the dental device. In another aspect, the ratchet mechanism may comprise a set of angled teeth or barbs. In this embodiment, the angled teeth are adapted such that they present a surface in an upward direction to the lower edge of the collar, and can firmly engage with the collar in one direction so that the collar will not slip down from that engaged position once so engaged; on the other hand, the angled teeth may present an angled, less abrupt deflecting undersurface in a downward direction to the collar, such that the collar can be readily slid upwards. In order to engage and secure the arm at a desired "height" along the ratchet mechanism, the user simply slides the arm (and hence the collar) to the appropriate "height" and then causes the lower edge of the collar to engage the top edge of one of the angled teeth. When the dental device is no longer required to be secured in place and is to be removed, the ratchet mechanism can allow for "quick-release" of the arm in a swift motion, so the arm can be slid down the body of the dental device.

In one aspect, the suction holes are oval in shape, although other shapes are possible. In one embodiment of the present invention, the dental device is also provided with one or more raised ribs or ridges near or on either side of the suction holes. The ribs serve to define guide channels to help direct the flow of fluids toward the holes. They also act to prevent the patient's soft tissues from getting too close to the suction holes and forming an air-tight seal against one or more of the suction holes, thereby protecting and preserving the aspirating function of the dental device.

In one aspect, the collar of the arm has an internal cross-section that is substantially square shaped. Correspondingly, the cross-section of the body where the ratchet mechanism is located is also substantially square shaped. This helps to stabilize the arm on the patient's chin by preventing it from rotating about the body of the device.

DETAILED DESCRIPTION OF THE INVENTION

A detailed description of one or more embodiments of the present invention is provided below along with accompanying figures that illustrate the principles of the invention. As such, this detailed description illustrates the present invention by way of example and not by way of limitation. The description will clearly enable one skilled in the art to make and use the invention, and describes several embodiments, adaptations, variations and alternatives and uses of the invention, including what is presently believed to be the best mode and preferred embodiment for employing the invention. It is to be understood that routine variations and adaptations can be made to the invention as described, and such variations and adaptations squarely fall within the spirit and scope of the invention. For the purpose of clarity, technical material that is known in the technical fields related to the invention has not been described in detail so that the invention is not unnecessarily obscured.

Figure 1:
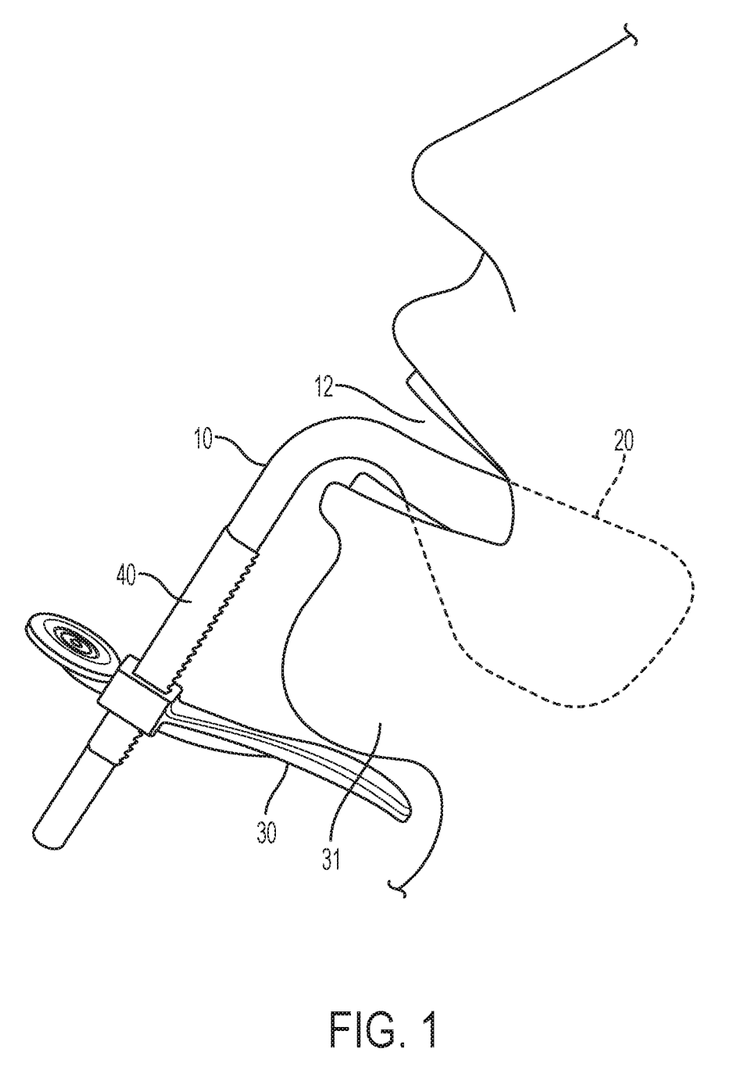
FIG. 1 is an illustration of an exemplary embodiment of the dental device of the present invention, showing it in use with a patient.
Figure 2:
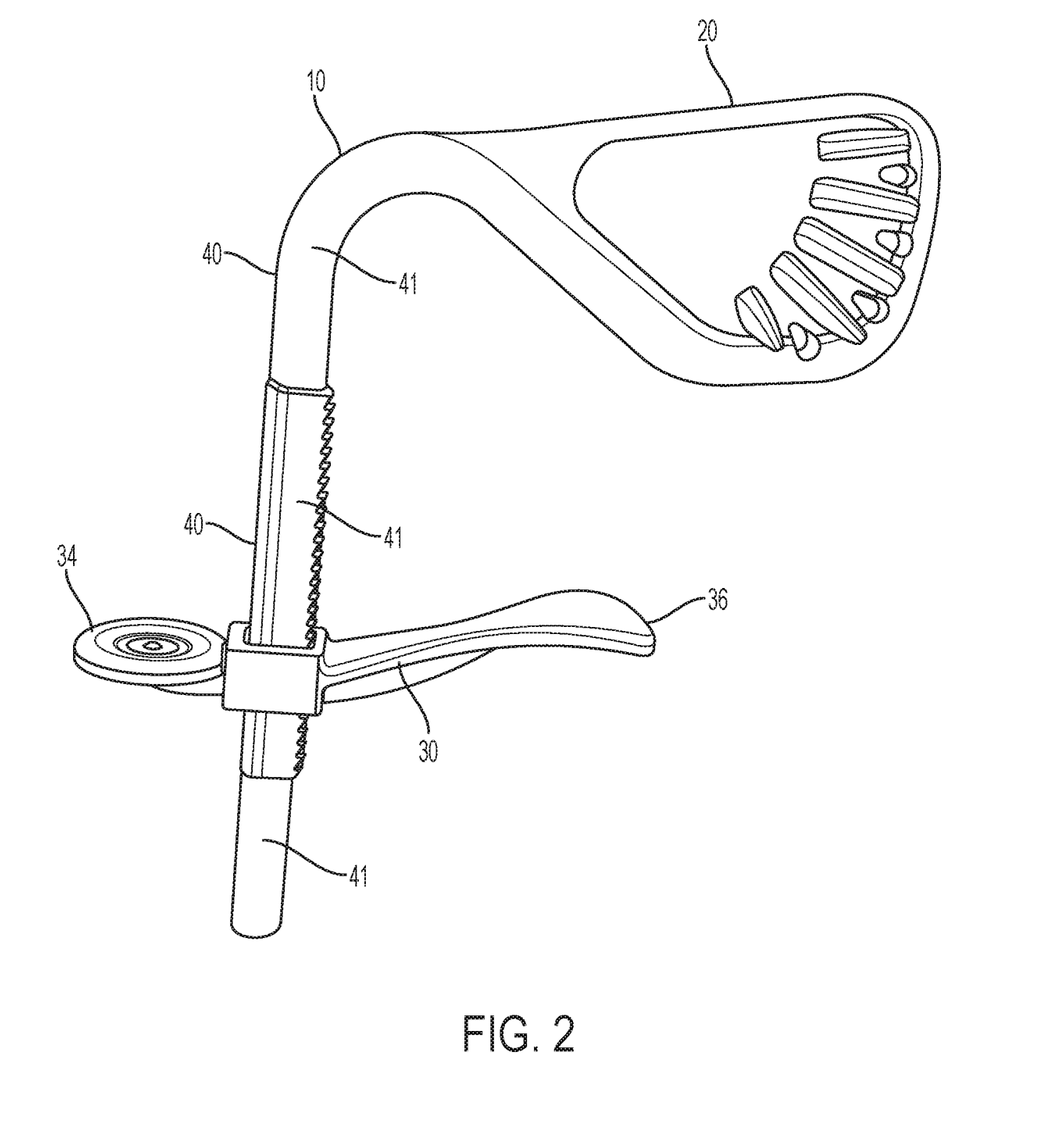
FIG. 2 is a perspective view of an exemplary embodiment of the dental device of the present invention.

FIGS. 1 and 2, illustrate an exemplary embodiment of the dental device 10, showing it in use with a dental patient (FIG. 1) and in isolation (FIG. 2). The dental device 10 comprises a generally paddle-shaped head portion 20, a body 40 and an arm 30. During dental treatments, the head portion 20 of the dental device 10 is inserted into one side of the patient's mouth between the tongue and the lower teeth, and functions to keep the operating field free and clear from the frequently interfering tongue. When in operation, the dental device 10 is attached to dental suction equipment, and functions to remove excess fluids (e.g. saliva, blood, water, etc.) from the patient's oral cavity 12.

Alternative shapes for the head portion 20 are possible besides the examples illustrated herein; generally, however, the head portion 20 should present enough of a surface area to act as a barrier to the patient's tongue, keeping it away from the work area. At the same time, the shape of the head portion 20 should preferably be thin and flat enough that it comfortably fits into the patient's mouth. It is of course understood that the head portion 20 can be differently sized, according to the size of a patient (e.g. child vs. adult).

Figure 3:
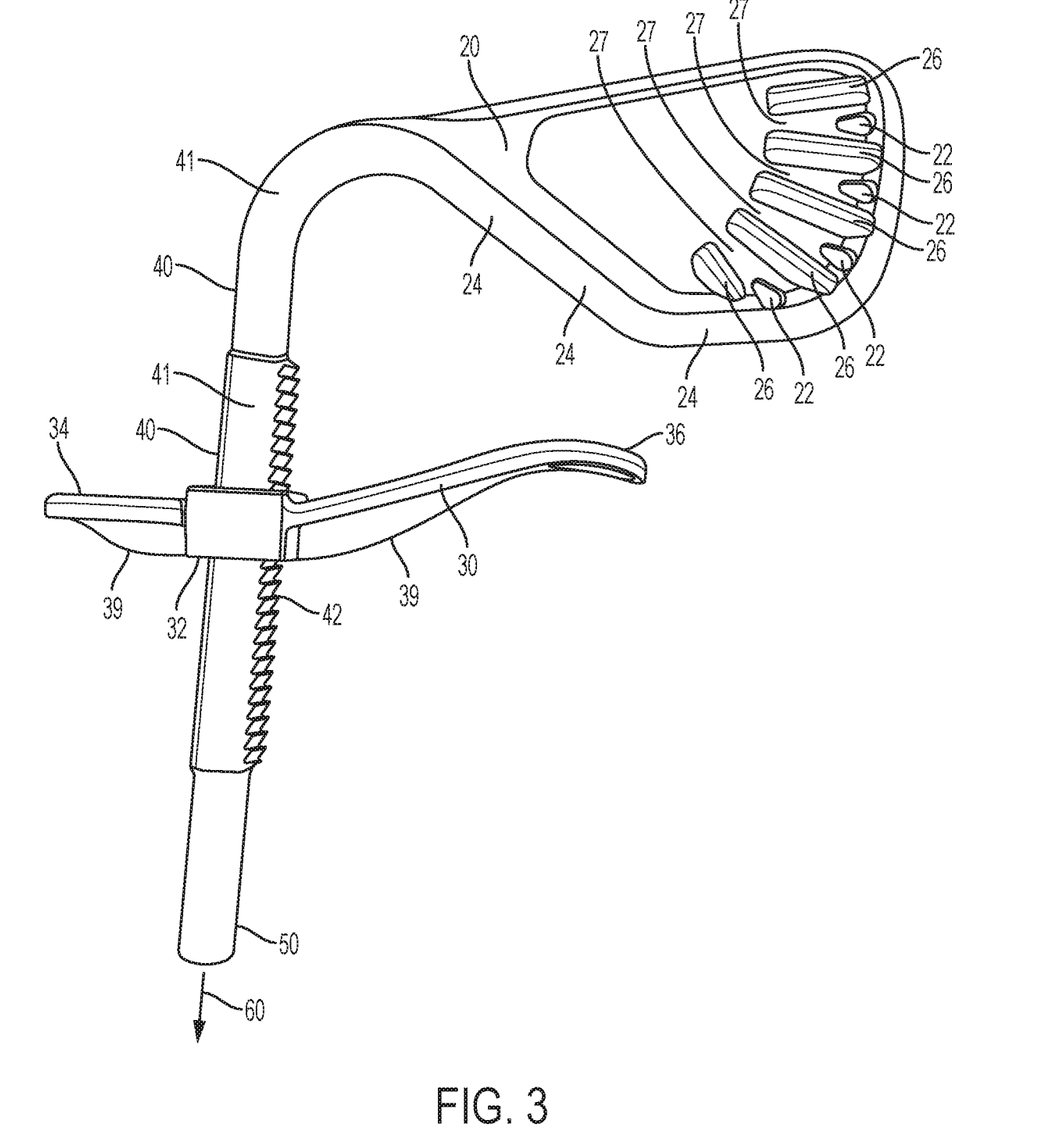
FIG. 3 is a side perspective view of the dental device, in accordance with an aspect of the present invention.

FIG. 3 provides a more detailed view of the dental device 10. Within the body 40 of the dental device 10, a hollow bore 41 is provided which extends along the length of the body 40 to the head portion 20. The bottom end of the dental device is provided with a connector 50, which is adapted to connect to the dental suction equipment 60.

The head portion 20 of the dental device 10 is provided with a hollow tubing 24 which generally extends around part of the periphery of the head portion 20. The hollow tubing 24 is in fluid communication with the bore 41 in the body 40 of the dental device. The head portion 20 is also provided with a plurality of openings or suction holes 22 situated around part of the periphery of the head portion 20. The suction holes 22 are configured to be in fluid communication with the hollow tubing 24, and with the bore 41. Any excess fluid buildup in the patient's mouth can be suctioned through these suction holes 22, and then into the hollow tubing 24, and then down the bore 41 in the interior of the body 40 of the dental device, through the connector 50 and out to the dental suction equipment 60. The precise number, size and location of the suction holes 22 is variable. Generally, however, in a preferred embodiment, there are 3-5 suction holes 22, each approximately 2-4 mm in diameter. The suction holes 22 should generally be disposed around that part of the periphery of the head portion 20, close to where fluids are likely to collect, when the dental device is positioned in the patient's oral cavity (for the majority of dental treatments, the patient is lying down). In practice. It has been discovered that oval or teardrop-shaped holes tend to produce substantially less of a "hissing/whistling" noise during the suctioning process, as compared with circular holes.

In a preferred embodiment, as can be seen in FIG. 3, the head portion 20 is also provided with one or more raised ribs or ridges 26 near and on either side of the suction holes 22. These ribs 26 serve a number of purposes. They define guide channels 27 to help direct any fluids toward the suction holes 22. They also help to keep the patient's soft tissues from being sucked into and plugging up the suction holes 22, and preventing their suctioning function. The precise shape, profile and orientation of the ribs 26 can take various forms, and these would be understood by a person skilled in the art.

As shown in FIG. 1, the dental device 10 is provided with an adjustable, elongate arm 30, which is configured to abut the patient's chin 31. When the dental device 10 is in use, the resistance between the head portion 20 resting on the floor of the patient's mouth and the arm 30 resting on the patient's chin act in concert to secure the dental device 10 in place.

The dental device 10 shown in FIG. 3 is provided with a ratchet mechanism 42, located on an external surface of the body 40 of the dental device 10 (on the inward, patient-facing side of the body 40). The ratchet mechanism 42 is adapted to allow the arm 30 and the body 40 to adjustably engage with, and disengage from, each other. In one embodiment, the integral collar 32 of the arm 30 surrounds the body 40 and engages with the teeth 43 of the ratchet mechanism 42 to lock the arm 30, and therefore the entire device, in place. In another embodiment, the collar 32 can disengage from the ratchet mechanism 42, allowing for a quick-release of the arm 30 from the body 40 of the device from the patient's mouth.

The external cross-section of the body 40, where the ratchet mechanism 42 is located, has at least one substantially flat exterior edge. Preferably, the exterior cross-section of the body 40 is substantially square-shaped or rectangular shaped. (In such case, the internal cross-section of the collar 32 will also be correspondingly substantially square or rectangular shaped). This feature helps prevent the arm 30 from twisting and rotating around the ratchet mechanism 42 of the body 40 during use.

Figure 6:
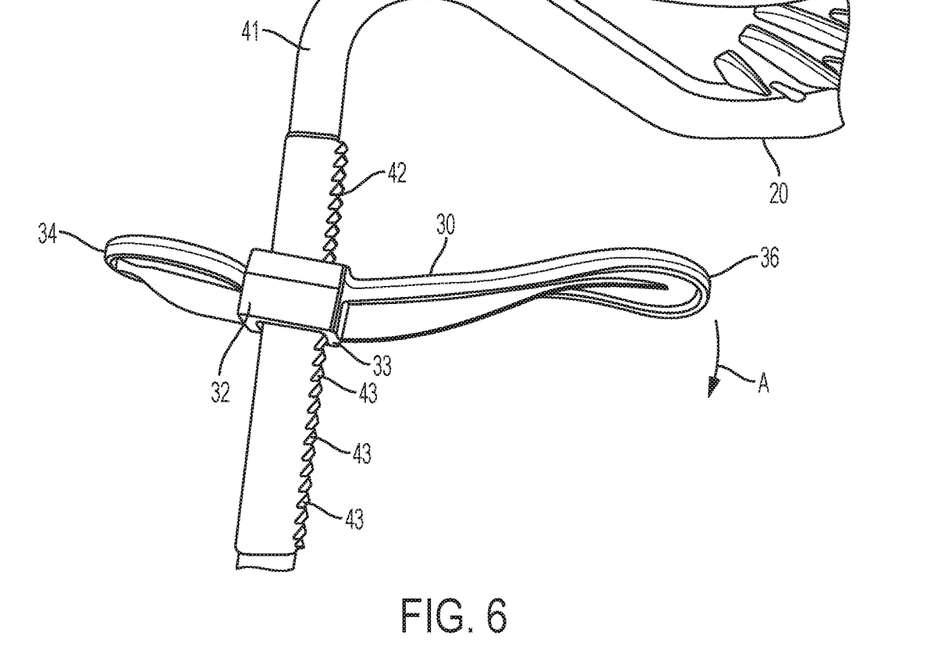
FIG. 6 is a perspective view of the dental device (viewed from the side and from slightly below), showing the arm and the ratchet mechanism in an engaged position.

Referring to FIG. 6, in a preferred embodiment, the ratchet mechanism 42 comprises a set of barbs or "teeth" 43. In this embodiment, there should preferably be a little "give" between the ratchet mechanism 42 and the collar 32, such that the collar 32 and the arm 30 can rock back and forth slightly about the ratchet mechanism 42 portion of the body 40. The arm 30 can tip down and in, to engage one of the teeth 43 so as to lock the arm 30, and the dental device as a whole, in place; the arm 30 can tip up and out so as to disengage from the teeth 43, allowing the arm 30, and the dental device 10 as a whole, to be removed from the patient's mouth. The teeth 43 are adapted to firmly engage with the lower inside edge 33 of the collar 32 of the arm 30 when downward pressure from the patient's chin is applied to the upper surface of the first arm extension 36 of the arm 30, locking it in place (in the direction shown as "A").

In order to secure the arm 30, and therefore the dental device 10, in place for use in a dental treatment, the user simply lifts the first arm extension 36 of the arm 30 upwards until it contacts the undersurface of the patient's chin. Resisting pressure from the patient's chin then tilts the first arm extension 36 slightly downward, which in turn has the effect of tilting the first arm extension 36 and the collar 32 in a slightly downward direction (in the direction shown as "A" in FIG. 6). Accordingly, the lower edge 33 of the collar 32 then engages the top surface or edge of one of the teeth 43 of the ratchet mechanism 42, locking the arm 30 and the dental device 10 in place. The suitable "height" of the arm 30 on the ratchet mechanism 42 is a consequence of the size of the patient. When the dental device 10 is no longer required, the user simply applies downward pressure to the second arm extension 34 of the arm 30. This tilts the collar 32 and the arm 30 in a slightly upward direction (in the direction shown as "B" in FIG. 7), thus lifting the lower edge 33 of the collar 32 away from and clear of the teeth 43 of the ratchet mechanism 42. This frees the arm 30 from both the patient's chin and the body 40 of the dental device 10, allowing it to be slid down the body 40 and allowing for a quick-release of the dental device 10 from the patient's mouth. (Note that in FIG. 6 and FIG. 7, the angle of the collar 32 and arm 30 relative to the body 40 has been slightly exaggerated, for purposes of illustration).

Figure 7:
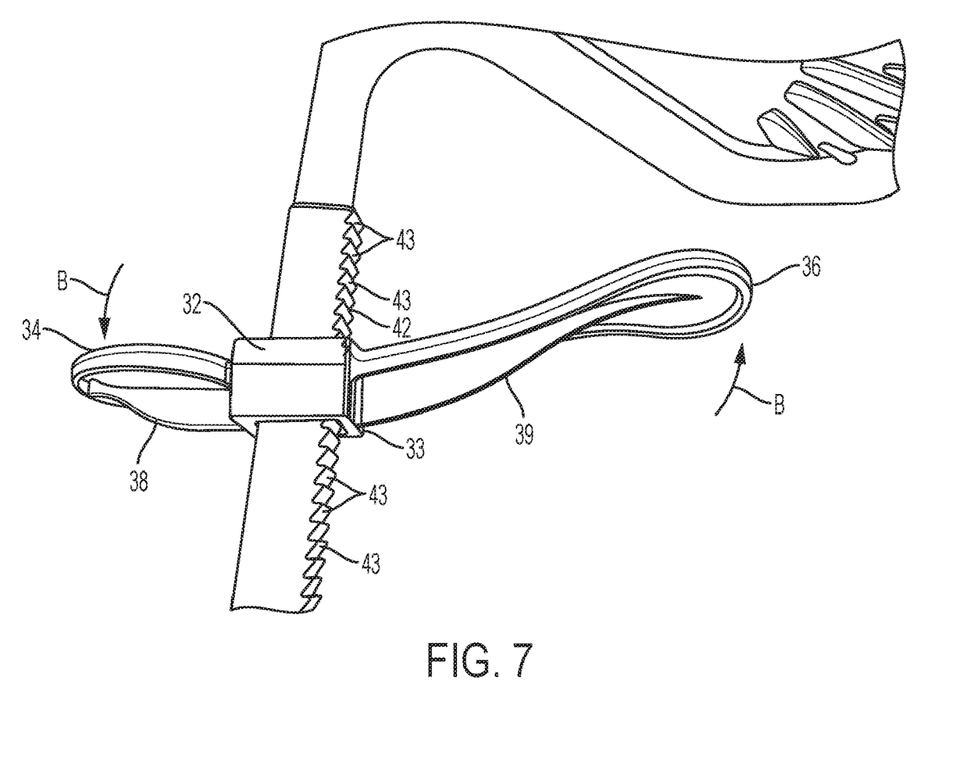
FIG. 7 is a perspective view of the dental device (viewed from the side and from slightly below), showing the arm and the ratchet mechanism in a disengaged position.

FIG. 7 shows the collar 32 and arm 30, after the lower edge 33 of the collar 32 has "cleared" the teeth 43 and is disengaged from the ratchet mechanism 42.

In one embodiment, the teeth 43 may be configured to be angled teeth 43 (i.e. the teeth are angled in a generally upward direction) such that the upper surface of each tooth presents a surface in an upward direction to the collar 32, such that the teeth 43 can firmly engage with the collar 32 in one direction and the collar 32 will not slip down from that engaged position once so engaged. The angled teeth 43 may present an angled, less abrupt surface in a downward direction to the collar 32, such that the collar 32 can be slid upwards easily (without catching on the teeth 43). In one embodiment, the teeth 43 may be configured such that their upper surface is substantially perpendicular to the longitudinal axis of the body 40 (i.e. flat), and their lower surface is angled.

Figure 4:
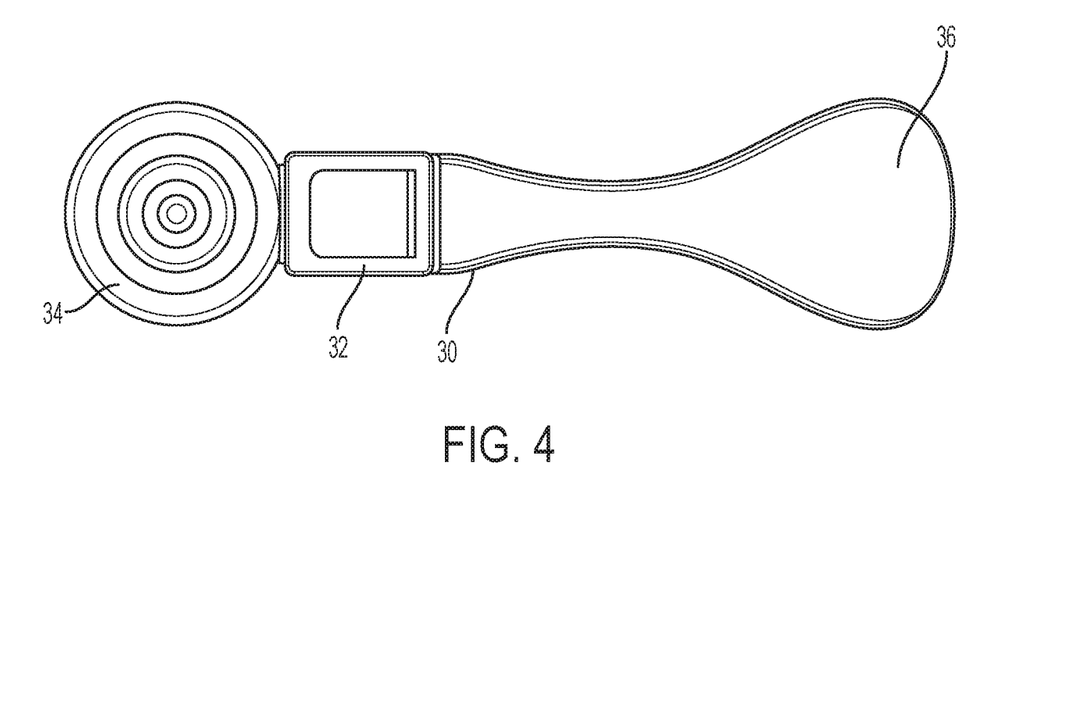
FIG. 4 is a top plan view of the arm of the dental device.
Figure 5:
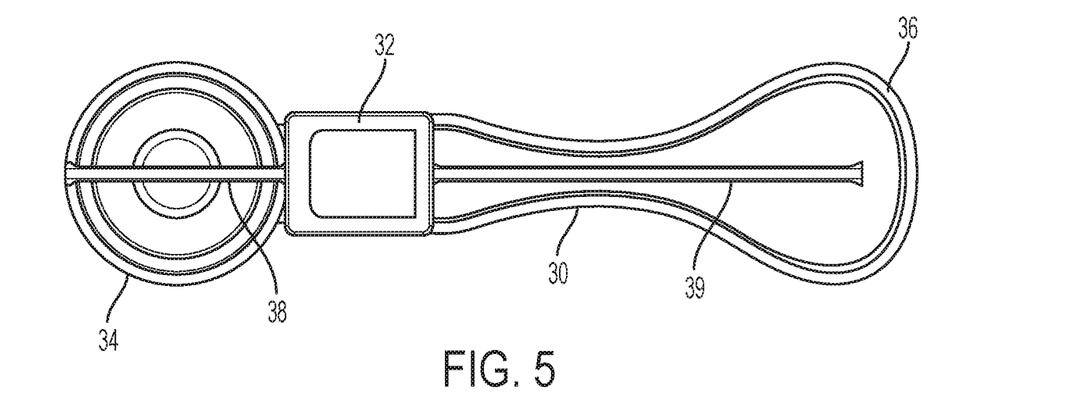
FIG. 5 is a bottom plan view of the arm of the dental device.

For purposes of illustration, a top plan view (i.e. view from above) of an exemplary embodiment of the arm 30 and collar 32 is shown in FIG. 4. A first arm extension 36 and a second arm extension 34 are shown. A bottom plan view of the arm 30 and the collar 32 is shown in FIG. 5. The arm 30 is shown as optionally having a number of braces or ribs 38, 39 which simply provide extra structural support to the arm. It will be apparent to a person skilled in the art that shape and style of the arm 30 (and the first and second arm extensions) may take various forms.

The dental device is generally made from plastic (although other materials are of course possible). Considerations as to the specific desired characteristics of the plastic material (e.g. in terms of hardness, lightness, flexibility, durability, texture, colour, biocompatibility, sterilisability, recyclability, cost, etc.) and the suitable type of plastic to use, would be understood by one skilled in the art. Generally speaking, the dental device should be lightweight, somewhat flexible and strong enough to secure the dental device in place and prevent the collar 32 of the arm 30 from rotating about the ratchet mechanism 42 of the body 40.

It is contemplated that the dental device is preferably manufactured using currently available 3D-printing or additive techniques. This can allow a greater degree of fine control and modifications, and/or customization for specific requirements (e.g. smaller sized dental devices for use with children). It is of course possible to manufacture the dental device using more traditional methods (such as injection molding, blow molding and other plastic molding methods).

Depending on the preferences of the users and materials available, the dental device may be a single-use disposable item, or a sterilisable, re-usable item. Factors such as cost and convenience will influence such choices.

Although the dental device is described herein as being comprised of several component parts, it is contemplated that the head portion and body portion would most preferably be a single, unitary item.

I claim:

1. A dental device for use as a combined fluids ejector and tongue retractor/deflector in dental treatments, and adapted to be placed into a patient's oral cavity between a patient's tongue and lower teeth, the dental device comprising:
   (i) a head portion, wherein the head portion is substantially flat and has a periphery, and comprises:
      a hollow tubing; and
      one or more suction holes, disposed proximate to a portion of the periphery and in fluid communication with the hollow tubing;
   (ii) a body portion provided with a bore, the bore having an upper end and a lower end, the bore in fluid communication at the upper end with the hollow tubing, and in communication at the lower end with a dental suction system, wherein the body portion is provided with a ratchet mechanism; and
   (iii) an arm, having a collar adapted to adjustably engage with and disengage from the ratchet mechanism,
   wherein the ratcheting mechanism comprises a plurality of angled teeth, angled in an upward direction, adapted to engage with the collar,
   wherein the collar has a lower edge adapted for engaging with an upper edge of one of the plurality of angled teeth,
   and wherein the collar has an internal longitudinal cross-section that is substantially square-shaped, and wherein the body portion where the ratcheting mechanism is disposed has an external cross-section that is substantially square-shaped.

2. The dental device of claim 1, wherein the head portion is provided with a plurality of raised ribs disposed proximate to the suction holes.

3. The dental device of claim 1, wherein there is a plurality of the suction holes, and the suction holes are disposed around a portion of the periphery of the head portion.

4. The dental device of claim 3, wherein the suction holes are substantially oval-shaped.

5. The dental device of claim 1, wherein the collar has a collar height corresponding to the vertical distance between the lower of the collar and an upper edge of the collar,
   wherein the ratcheting mechanism has a teeth pitch distance corresponding to a distance between adjacent ones of the plurality of angled teeth,
   and wherein the collar height is at least twice the teeth pitch distance.

6. The dental device of claim 5, wherein the collar height is at least four times the teeth pitch distance.

* * * * *